(12) United States Patent
Vary

(10) Patent No.: US 7,107,169 B2
(45) Date of Patent: Sep. 12, 2006

(54) DEVICE FOR ESTIMATING THE MASS FLOW OF FUEL

(75) Inventor: Florian Vary, Melun (FR)

(73) Assignee: Snecma Moteurs, Paris (FR)

( * ) Notice: Subject to any disclaimer, the term of this patent is extended or adjusted under 35 U.S.C. 154(b) by 133 days.

(21) Appl. No.: 10/911,521

(22) Filed: Aug. 5, 2004

(65) Prior Publication Data
US 2005/0043905 A1 Feb. 24, 2005

(30) Foreign Application Priority Data
Aug. 22, 2003 (FR) .................................. 03 10106

(51) Int. Cl.
*G01F 1/12* (2006.01)
*G01F 1/50* (2006.01)
(52) U.S. Cl. .................. 702/100; 702/45; 73/1.16; 73/1.34; 700/282
(58) Field of Classification Search ............... 702/98, 702/100, 13, 8; 73/1.16, 1.19, 1.21, 1.23, 73/1.34, 1.35, 1.57, 1.59, 861, 861.01, 861.42; 700/282–285
See application file for complete search history.

(56) References Cited

U.S. PATENT DOCUMENTS

| | | | |
|---|---|---|---|
| 4,593,523 A | 6/1986 | Hawes | 60/34.281 |
| 5,303,541 A | 4/1994 | Goff et al. | 60/773 |
| 6,148,601 A | 11/2000 | Jones et al. | 60/773 |
| 2005/0284235 A1* | 12/2005 | Kielb et al. | 73/861.42 |

FOREIGN PATENT DOCUMENTS
GB 2195448 A * 4/1988
* cited by examiner

*Primary Examiner*—Hal Wachsman
*Assistant Examiner*—Manuel L. Barbee
(74) *Attorney, Agent, or Firm*—Oblon, Spivak, McClelland, Maier & Neustadt, P.C.

(57) ABSTRACT

The invention relates to a device for determining a measurement of mass flow of fluid for a combustion chamber comprising a fluid metering device and a means of measuring the position of the metering device being measured. This device comprises:
  a mass flow meter,
  a hybridisation device for determining an actual mass flow of fluid comprising:
    a first input comprising a set-point value (WF set-point, Xset-point),
    a prediction unit (26) capable of determining, from the first input and variables of state comprising the actual mass flow (WF actual) and parametric unknowns (IP), estimated values (^WF flow meter, ^Xmetering device),
    a second input comprising the measured position of the metering device (Xmetering device) and the measured mass flow of fluid (WF flow meter),
    a calculator of residues (30, 22, 20) for determining a first residue (Rmetering device) between the measured position of the metering device and the estimated position of the metering device and a second residue (Rflow meter) between the measured mass flow of fluid and the estimated mass flow of fluid,
    a correction unit (24) for determining, from the first and second residues corrections capable of being applied to variables of state (WF actual, IP).

18 Claims, 4 Drawing Sheets

DEVICE FOR ESTIMATING THE MASS FLOW OF FUEL

FIELD OF THE INVENTION

The invention relates to the field of turbojets, and more particularly that of estimating the mass flow of fuel being injected into the combustion chamber of the turbojet.

BACKGROUND OF THE INVENTION

In the case of aeroplane turbojets, it is crucial to determine precisely the mass flow of fuel being injected into the combustion chamber of the turbojet. This is because by estimating the mass flow the mass flow of reduced fuel can be calculated, as well as the richness of the air/kerosene mix. The more precise this estimate of mass flow, the more precise the calculation of mass flow of reduced fuel as well as the richness of the air-kerosene mix. Since the acceleration and deceleration limits are generally expressed as a function of the mass flow of reduced fuel, the lack of accuracy in calculating this flow reduces the performance of the engine. Moreover, the control of polluting emissions requires knowledge of the richness of the air/kerosene mix of the chamber, and the lack of precision in calculating this richness reduces the quality of this control. In general, control of the engine is made possible by estimating the mass flow of fuel injected.

It is currently known to estimate the mass flow of fuel injected into the combustion chamber in two different ways. The mass flow of fuel injected may be measured from the measurement of the position of the fuel metering device and from an associated equation. However, since the measurement is a random signal, the mass flow calculated is subject to interference. Moreover, the equation linking the position of the metering device to the mass flow passing through the same contains some unknowns in its parameters. These unknowns are due in particular to the variability of the density and viscosity of the fuel, to manufacturing tolerances in the geometric features of the metering device, to the precision of hydromechanical control of the pressure differential through the metering device and to the precision of electromechanical control of the position of the slide valve of the metering device.

The mass flow of fuel injected may also be measured from the measurement of mass flow by a conventional flow meter. However, the dynamics of a mass flow meter are too poor for use in the control of an engine.

SUMMARY OF THE INVENTION

The present invention has just improved the situation.

The invention relates to a device for determining a measure of mass flow of fluid for a combustion chamber comprising a fluid metering device and a means of measuring the position of the metering device known as the measured position.

According to a feature of the invention, the device for determining a measure of the mass flow of fluid for a combustion chamber comprises:
  a mass flow meter for measuring a mass flow of fluid known as the measured flow,
  a hybridisation device suitable for determining an actual mass flow of fluid comprising:
    a first input comprising a set-point value of the mass flow sought or a set-point value of the position of the metering device sought,
    a prediction unit capable of determining, from the first input and variables of state comprising the actual mass flow and parametric unknowns, estimated values comprising the estimated position of the metering device and the estimated mass flow,
    a second input comprising the measured position of the metering device and the measured mass flow of fluid,
    a calculator of residues capable of determining a first residue between the measured position of the metering device and the estimated position of the metering device and a second residue between the measured mass flow of fluid and the estimated mass flow of fluid,
    a correction unit capable of determining, from the first and second residues, corrections capable of being applied by the estimation unit to the variables of state.

The invention also relates to a process of determining a measurement of mass flow of fluid for a combustion chamber comprising the stages consisting of:
a- entering a set-point value of the mass flow sought or a set-point value of the position of the metering device sought, and variables of state comprising the actual mass flow and parametric unknowns,
b- determine from stage a- estimated values comprising the estimated position of the fluid metering device and the estimated mass flow,
c- measure the mass flow of fluid from a mass flow meter and the position of the fluid metering device,
d- calculate a first residue between the measured position of the metering device and the estimated position of the metering device and a second residue between the measured mass flow of fluid and the estimated mass flow of fluid,
e- calculate corrections from the first and second residues and apply these to the variables of state.

BRIEF DESCRIPTION OF THE DRAWINGS

The attached figures illustrate embodiments of the invention in a non-limiting manner as follows.

DETAILED DESCRIPTION OF EMBODIMENTS OF THE INVENTION

Appendix A comprises the various mathematical equations used by the device according to the invention as well as the notations and meanings of variables of state used.

The drawings and appendices contain, essentially, elements of a definite character. They may therefore serve not only to aid understanding of the description, but also contribute to the definition of the invention if necessary.

Figure 1:
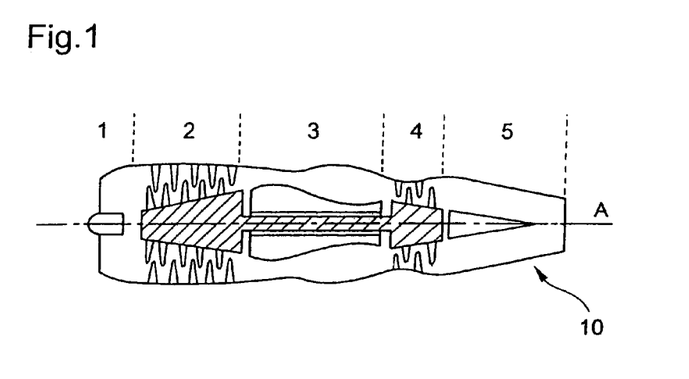
FIG. 1 shows diagrammatically a turbojet in section along its axis of rotation.

FIG. 1 shows a turbojet in section along its axis of rotation A. The various parts of the turbojet are separated by broken lines. The turbojet comprises an air inlet 1 followed by the compressor 2 adapted to compress the air taken into the compressor, a combustion chamber 3 into which kerosene is injected, which mixes with the compressed air emerging from the compressor, a turbine 4 and a nozzle 5. A turbojet may comprise other combustion chambers, for example, a post-combustion chamber (not shown). The term "combustion chamber" will be used below in a non-limiting manner to refer to a type of combustion chamber.

In such a turbojet, it is important to know the mass flow of fuel injected into the combustion chamber. This is because by estimating the mass flow it is possible to calculate of the mass flow of reduced fuel as well as the richness of the air/kerosene mix. The more precise this estimate of mass flow, the more precise the calculation of mass flow of reduced fuel as well as the richness of the air-kerosene mix. Since the acceleration and deceleration limits are generally expressed as a function of the mass flow of reduced fuel, the lack of accuracy in calculating this flow reduces the performance of the engine. Moreover, the control of polluting emissions requires knowledge of the richness of the air/kerosene mix of the chamber, and the lack of precision in calculating this richness reduces the quality of this control. In general, control of the engine is made possible by estimating the mass flow of fuel injected.

Currently, and as is indicated above, it is known to estimate the mass flow of fuel injected into the combustion chamber in two different ways. However, none of these determinations of flow is satisfactory in terms of precision or dynamics.

Figure 2:
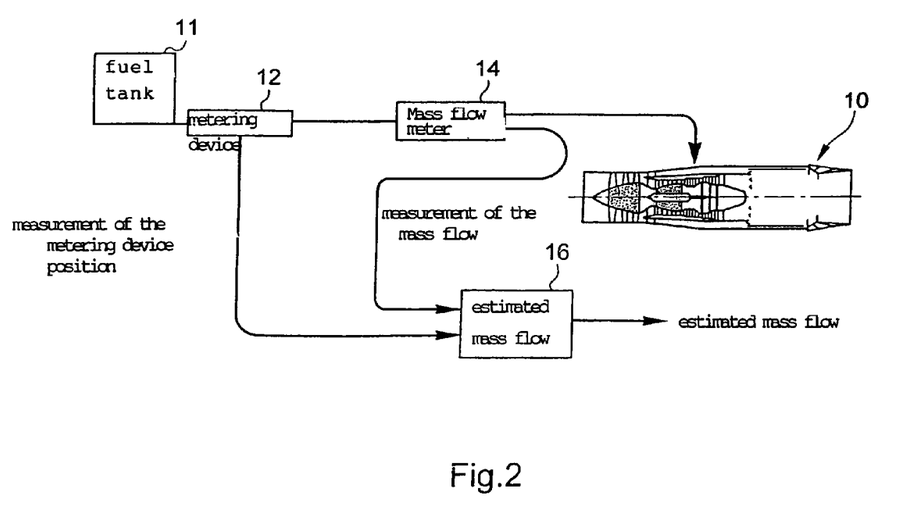
FIG. 2 shows the device for measuring the mass flow according to the invention.

According to the invention, FIG. 2 has the device for measuring the mass flow of fluid, in particular fuel in the present case. A tank 11 of fuel supplies the combustion chamber of the turbojet 10. This supply of fuel is controlled by a metering device 12 comprising a slide valve. The metering device comprises a means of measuring the position of the slide valve. In the rest of the description, the position of the slide valve of the metering device is also known as the position of the metering device. A mass flow meter 14 makes possible direct measurement of the mass flow of the fuel before this is injected into the combustion chamber 2 of the turbojet 10. Measurement of the position of the metering device $X_{metering\ device}$ and direct measurement of the mass flow $WF_{flow\ meter}$ are received as input by the hybridisation device 16 according to the invention, making it possible to determine the mass flow of fuel injected into the combustion chamber in a precise manner. The position of the mass flow meter 14 can be either upstream or downstream of the metering device 12 relative to the distribution of fuel in the combustion chamber.

Figure 3:
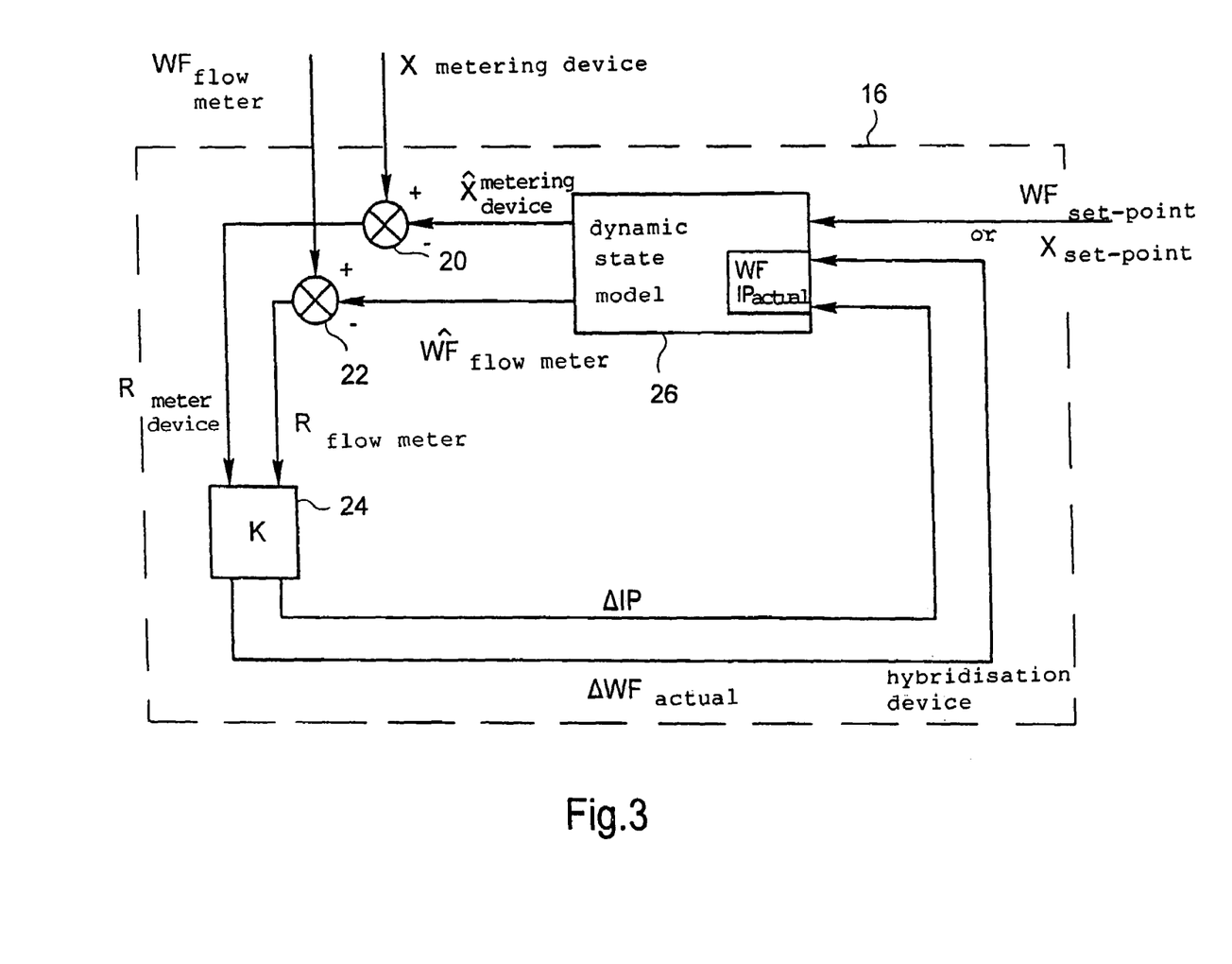
FIG. 3 shows the hybridisation device comprised in the measuring device of FIG. 2.

The hybridisation device 16 of the measuring device of the mass flow of fuel is more particularly detailed in FIG. 3.

This hybridisation device 16 comprises a first input U (Appendix A10) consisting of a set-point value $WF_{set-point}$ of the mass flow of fuel sought or $X_{set-point}$ of the metering device position sought. The hybridisation device also comprises a prediction unit 26 for determining from the input U an output Y (Appendix A9) comprising an estimated position of the metering device $^\wedge X_{metering\ device}$ and an estimated mass flow $^\wedge WF_{flow\ meter}$. This determination is effected by a dynamic state model comprising as variables of state in the form of a state vector Z: the actual mass flow $WF_{actual}$ and a vector of parametric unknowns IP of any size. The parametric unknowns comprise those inherent in the relation linking the position of the metering device to the mass flow passing therethrough. These parametric unknowns are introduced by the following factors:

the variability of the density and viscosity of the fuel, essentially inherent in the process of fractional distillation of petroleum, but also dependent on the temperature, the manufacturing tolerances on the geometric features of the elements of the fuel circuit, these mainly being those of the metering device, the precision and quality of hydromechanical control of the pressure differential through the metering device, the precision of electromechanical control of the position of the metering device slide valve.

The prediction unit may comprise by way of example a dynamic state model, as indicated at A11. The prediction unit thus makes it possible to calculate by iteration the outputs Y as a function of the variables of state, themselves a function of inputs U. This model can be a linear state model of the first order in which:

the vector of variables of state Z at the iteration n+1 depends on the vector of variables of state Z at the iteration n, of the input vector U at the iteration n, of the state matrix F, the output vector Y at the iteration n+1 depends on the vector of variables of state Z at the iteration n, of the output matrix H.

More generally, the dynamic state model may be stationary when the matrices F and H are fixed or non-stationary when the matrices F and H depend on inputs such as WFset-point or Xset-point in the example A11.

The measurement of position of the metering device $X_{metering device}$ and the measurement of the mass flow $WF_{flow\ meter}$, carried out respectively by means of measuring the position of the metering device and mass flow meter, are received by the hybridisation device as an input. A calculator of residues 20, 22 makes it possible to determine the difference between the measured mass flow of the fuel $WF_{flow\ meter}$ and the estimated mass flow of fluid $^\wedge WF_{flow\ meter}$, this difference being called the residue of the flow meter $R_{flow\ meter}$ as indicated in Appendix A2. The residue calculator also makes it possible to determine a second residue between the measured position of the metering device $X_{metering\ device}$ and the estimated position of the metering device $^\wedge X_{metering\ device}$, this difference being called the residue of the metering device as indicated in Appendix a1. The residue vector is therefore as defined in A6.

The hybridisation device also comprises a correction unit 24 whereby it is possible to calculate, from the residue vector R as indicated in Appendix A3, the correction vector C composed of the correction $\Delta WF_{actual}$ and the correction $\Delta IP$, the latter corresponding to a correction vector of the vector of parametric unknowns IP. This correction vector C is the result of multiplication of a matrix of correction gains K whose coefficients may be variable or fixed.

The calculation of this correction vector C according to Appendix A3 permits the correction of variables of state corresponding to the actual mass flow $WF_{actual}$ and to the parametric unknowns IP (vector of parametric unknowns) as defined in Appendices A4 and A5. Thus, before each iterative calculation of estimation by the prediction unit 26, the variables of state are corrected by means of the correction vector C.

Advantageously, the combination of measurements taken from the metering device and from the mass flow meter and the processing of such measurements by the hybridisation device allows one to obtain precise evaluations of mass flow and according to dynamics adapted to the control of the engine. Advantageously, this processing of measures is effected iteratively so as to refine the result of mass flow obtained.

Figure 4:
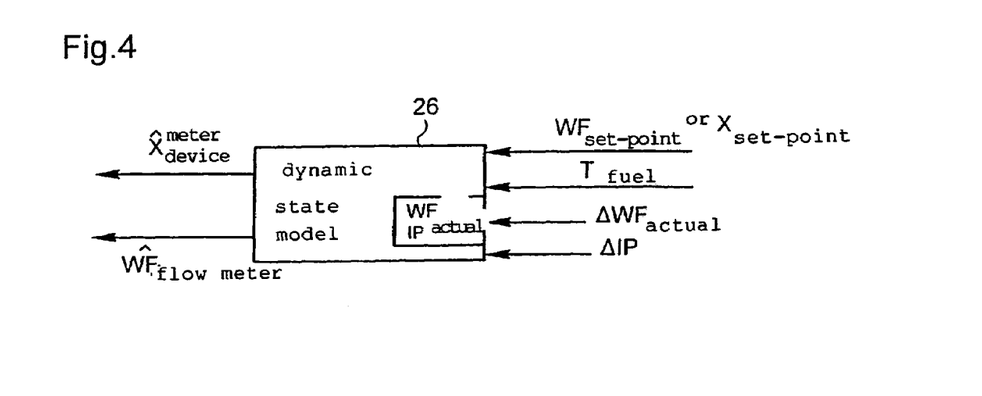
FIG. 4 shows partially the hybridisation device of FIG. 2 according to a first modified embodiment of the invention.
Figure 5:
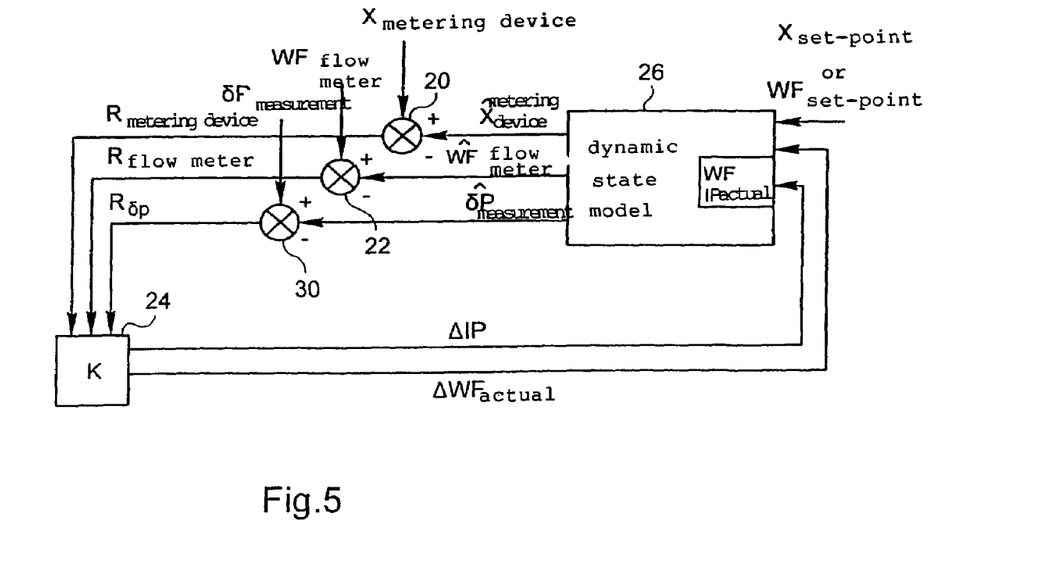
FIG. 5 shows the hybridisation device of FIG. 2 according to a second modified embodiment of the invention.

Other possible embodiments of the invention are detailed in FIGS. 4 and 5. FIG. 4 shows in detail the improvement in the prediction unit 26 of FIG. 3. This prediction unit has an additional input corresponding to a measurement of the fuel temperature. This measurement is effected by a known temperature measuring means. Knowledge of the fuel temperature desensitises the parametric unknowns IP used by the prediction unit 26 in terms of variations of this temperature.

FIG. 5 shows the hybridisation device of FIG. 3 according to a third embodiment. The outputs of the prediction unit 26 comprise in addition to the estimated position of the metering device and estimated mass flow the estimated value of the pressure differential through the fuel metering device $\hat{\delta P}_{measurement}$. How this estimated value is obtained by the prediction unit 26 is detailed below. A measurement of differential pressure through the fluid metering device is also effected then transmitted to the hybridisation device 16. The residue calculator 20, 22, 30 makes it possible to determine the difference between the measured pressure differential and the estimated pressure differential, this difference being called the residue of the pressure differential $R_{\delta P}$. The residue vector R comprises, in addition to the components defined in A6, the residue of the pressure differential $R_{\delta P}$. The corrections $\Delta WF_{actual}$, $\Delta IP$ are calculated after multiplication of the correction gain matrix K and of the residue vector R.

Obviously, the embodiment of FIG. 3 may comprise modifications of FIG. 4 and of FIG. 5.

In order to obtain an optimum estimate of the mass flow of fuel, the correction gain matrix K may also correspond to the gains of a Kalman filter. The coefficients of this matrix are then variable at each new iteration n of the evaluation of mass flow. In Appendix A7, the recursive Kalman filter is detailed. The meaning of the variables of the filter is indicated in the appendix. In particular, the matrices of covariance of the state interference Q and of covariance of the measurement interference R are used. In A8, the state vector Z of the filter comprises as components the variables of state of the prediction unit 26. In A9, the vector Y of estimated outputs of the prediction unit 26 comprises as components the estimated position of the metering device ($\hat{X}_{metering\ device}$) and an estimated mass flow $\hat{WF}_{flow\ meter}$. In one embodiment of the invention it may also comprise the estimated value of the pressure differential through the fuel metering device $\hat{\delta P}_{measurement}$. In A10, the input vector U comprises the set-point value of mass flow sought $WF_{set-point}$ or of the position of the metering device sought $X_{metering\ device}$.

It is known that the accuracy of a mass flow meter depends on the flow passing through the same. In general, this accuracy is higher with a strong flow than with a weak flow. Thus the correction unit 24 is capable of adapting directly or indirectly the coefficients of the correction gain matrix K as a function of the value of mass flow measured by the mass flow meter. Thus the correction unit is capable of modifying the coefficients of the correction gain matrix K in order to give variable relative importance between the measurement of the position of the metering device $X_{metering\ device}$ and the measurement of the mass flow meter $WF_{flow\ meter}$ in calculating the estimate of the actual mass flow $WF_{actual}$. It is thus possible to determine a continuous adaptation of the correction unit 24 over the whole range of operation in fuel flow. This adaptation of the gain of K can be effected by a law or by modifying the matrices of covariance Q and R.

Figure 6:
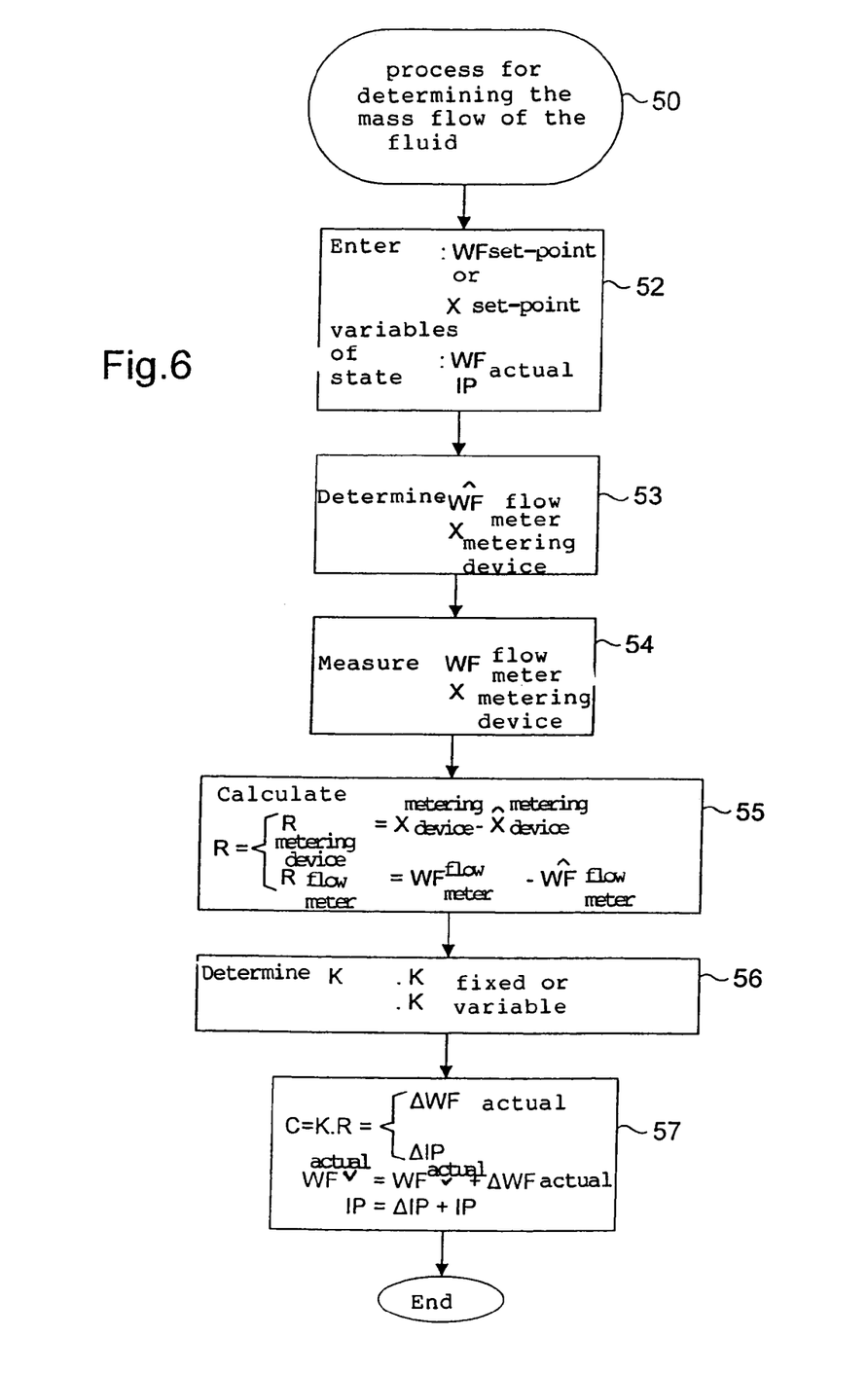
FIG. 6 shows the process of determining the mass flow of fluid according to the invention.

FIG. 6 shows the method of determining the mass flow of fuel as it is carried out by the device illustrated in FIG. 3.

At the stage 52, the set-point value of the mass flow of fuel sought or the set-point value of the position of the metering device sought is received as an input of the hybridisation device. The prediction unit uses a model based on the variables of state of actual mass flow and parametric unknowns in order to determine, from the set-point value of the mass flow sought $WF_{set-point}$ or from the position of the metering device sought $X_{metering\ device}$, the estimated position of the metering device $\hat{X}_{metering\ device}$, and the estimated mass flow $\hat{WF}_{flow\ meter}$ at the stage 53. At the stage 54, the mass flow values of the fuel and the position of the metering device are measured and received as input by the hybridisation device so as to calculate at the stage 55 the residue vector comprising the residue of the metering device and the residue of the flow meter. At the stage 56, the correction gain matrix K is determined. The coefficients thereof may be fixed or variable. In the latter case, K may be calculated by a law which is a function of the set-point mass flow $WF_{set-point}$, measured $WF_{flow\ meter}$ or actual $WF_{actual}$ or a function of the set-point position of the metering device $X_{set-point}$, the measured position of the metering device $X_{metering\ device}$ or of the actual position of the metering device $X_{actual}$. K can also be calculated from recursive relations A7. From this residue vector and the correction gain matrix K, the correction vector C is calculated at the stage 57, these corrections being applied to the actual mass flow $WF_{actual}$ and to the parametric unknowns IP at the stage 57. The process can therefore start all over again at stage 52 so as to refine the determination of actual mass flow $WF_{actual}$. Thus, as the iterations of the process are carried out, all the variable data are recalculated and refined, e.g. the parametric unknowns are refined and make it possible to determine more precisely the estimated values of the mass flow of the fuel and of the position of the metering device, which values are compared to the measured values as are described above.

The invention is not limited to the embodiments described above purely by way of example, but extends to all modifications conceivable by the person skilled in the art within the scope of the following claims.

ANNEX A

A1- $R_{metering\ device} = X_{metering\ device} - \hat{X}_{metering\ device}$

A2- $R_{flow\ meter} = WF_{flow\ meter} - \hat{WF}_{flow\ meter}$

A3- $C = K \times R \quad C = \begin{bmatrix} \Delta WF_{acutal} \\ \Delta IP \end{bmatrix} \quad R = \begin{bmatrix} R_{metering\_device} \\ R_{flow\_meter} \end{bmatrix}$ A4- $WF_{actual} = WF_{actual} + \Delta WF_{actual}$ A5- $IP = IP + \Delta IP$ A6- $R = \begin{bmatrix} R_{metering\_device} = X_{metering\_device} - \hat{X}_{metering\_device} \\ R_{flow\_meter} = WF_{flow\_meter} - \hat{WF}_{flow\_meter} \end{bmatrix}$ A7- $P_{n+1/n} = F \cdot P_{n/n} \cdot F^T + Q$ $K_{n+1} = P_{n+1/n} \cdot H^T (H \cdot P_{n+1/n} \cdot H^T + R)^{-1}$ $P_{n+1/n+1} = P_{n+1/n} - K_{n+1} \cdot H \cdot P_{n+1/n}$ -continued A8- $Z = \left[\dfrac{WF_{actual}}{IP}\right]$ A9- $Y = \left[\dfrac{\hat{WF}_{flow\_meter}}{\hat{X}_{metering\_device}}\right]$ A10- $U = [WF \text{ set-point or } X \text{ set-point}]$ A11- $Z_{n+1} = F \cdot Z_n + U_n$ $Y_{n+1} = H \cdot Z_n$

A12 NOTATIONS

Xconsigne: metering device position sought
WFconsigne: mass fuel flow sought
WFreel: mass flow actually delivered by the metering system
WFdebitmetre mass flow measured by the flow meter
^WFdebitmetre estimated mass flow
ΔWFreel correction of actual mass flow
Xdoseur measured position of the metering device slide valve
^Xdoseur estimated position of the metering device slide valve
Rdebitmetre residue of mass flow
Rdoseur residue of the position of the metering device slide valve
IP vector of parametric unknowns
ΔIP correction vector of vector of parametric unknowns
K correction gain matrix
z vector of state of filter
Y vector of estimated outputs
U vector of set-point inputs
H output matrix
F state matrix
Q matrix of covariance of the state interference
v state interference
R matrix of covariance of measurement interference
w measurement interference

What is claimed is:

1. A device for determining a measurement of mass fluid flow for a combustion chamber comprising a fluid metering device and a means of measuring the position of metering device known as the measured position, said device comprising:
    a mass flow meter for measuring a mass flow of fluid known as the measured flow,
    a hybridisation device suitable for determining an actual mass flow of fluid comprising:
        a first input comprising a set-point value (WFset-point) of the mass flow sought or a set-point value (Xset-point) of the position of the metering device sought,
        a prediction unit capable of determining, from the first input and variables of state comprising the actual mass flow (WFactual) and parametric unknowns (IP), estimated values comprising the estimated position of the metering device (^Xmetering device) and the estimated mass flow (^WF flow meter),
        a second input comprising the measured position of the metering device (Xmetering device) and the measured fluid mass flow (WFflow meter),
        a calculator of residues capable of determining a first residue (Rmetering device) between the measured position of the metering device and the estimated position of the metering device and a second residue (Rflow meter) between the measured fluid mass flow and the estimated fluid mass flow,
        a correction unit capable of determining from the first and second residues corrections capable of being applied by the prediction unit to the variables of state (Wfactual, IP).

2. A device according to claim 1, wherein the prediction unit comprises a dynamic model at the state linking the first input to the variables of state and estimated values.

3. A device according to claim 1, wherein the correction unit comprises a correction gain matrix whose coefficients are fixed.

4. A device according to claim 1, wherein the correction unit comprises a correction gain matrix whose coefficients are variable.

5. A device according to claim 1, wherein the correction unit comprises a correction gain matrix whose coefficients are variable and the coefficients are determined by a mathematical law dependent on the mass flow of fluid or on the position of the metering device.

6. A device according to claim 1, wherein the correction unit comprises a correction gain matrix whose coefficients are variable and the correction gain matrix is a gain matrix of the Kalman filter (K), determined dynamically.

7. A device according to claim 1, wherein the correction unit comprises a correction gain matrix whose coefficients are variable the correction gain matrix is a gain matrix of the Kalman filter (K), determined dynamically by the use of matrices relating to the interference, submitted to continuous adaptation of their coefficients.

8. A device according to claim 1, wherein the first input further comprises a measured value of the temperature of the fluid (Tfuel).

9. A device according to claim 1, wherein the second input comprises a measured value of a pressure differential through the fluid metering device (^δPmeasurement), the estimated values comprise an estimated value of this pressure differential (^δPmeasurement), the residue calculator is capable of determining a third residue ($R_{\delta P}$), between the measured value and the estimated value of the pressure differential, and the correction unit is capable of determining, from the first, second and third residues, corrections suitable for application by the prediction unit to the variables of state.

10. A process of determining a measurement of mass flow of a fluid for a combustion chamber, said process comprising the steps of:
    a- entering a set-point value (WFset-point) of the mass flow sought or a set-point value (X set-point) of the position of the metering device sought, and variables of state comprising the actual mass flow (WF actual) and parametric unknowns (IP),
    b- determining from step a- estimated values comprising the estimated position of the fluid metering device (^X metering device) and the estimated mass flow (^WF-flow meter),
    c- measuring the mass flow of fluid (WFflow meter) from a mass flow meter and the position of the fluid metering device (Xflow meter),
    d- calculating a first residue (Rmetering device) between the measured position of the metering device and the estimated position of the metering device and a second residue (Rflow meter) between the measured mass flow of fluid and the estimated mass flow of fluid, e- calculating corrections from the first and second residues and apply these to the variables of state (WFactual, IP).

11. A process according to claim 10, wherein said step b- comprises using a dynamic model in the state linking the set-point value to the variables of state and the estimated values.

12. A process according to claim 10, wherein said step e- comprises using a correction gain matrix whose coefficients are fixed.

13. A process according to claim 10, wherein said step e- comprises using a correction gain matrix whose coefficients are variable.

14. A process according to claim 10, wherein said step e- comprises using a correction gain matrix whose coefficients are variable and the step e- comprises determining the coefficients by a mathematical law dependent on the mass flow of fluid or on the position of the metering device.

15. A process according to claim 10, wherein said step e- comprises using a correction gain matrix whose coefficients are variable and the correction gain matrix of the step e- is a gain matrix of the Kalman filter (K) and is determined dynamically.

16. A process according to claim 15, wherein said step e- comprises using a correction gain matrix whose coefficients are variable and the correction gain matrix of the step e- is a gain matrix of the Kalman filter (K) and is determined dynamically by the use of matrices relating to the interference, this use being submitted to continuous adaptation of their coefficients.

17. A process according to claim 10, wherein said step a- further comprises entering a measured value of the temperature of the fluid (Tfuel).

18. A process according to claim 10, wherein said step b- further comprises determining an estimated value of a pressure differential through the fluid metering device ($\hat{\delta}$Pmeasurement), the step c- further comprises measuring this pressure differential ($\hat{\delta}$Pmeasurement), the step d- further comprises calculating a third residue ($R_{\delta P}$) between the measured value and the estimated value of the pressure differential, and the step e- further comprises calculating corrections from the first and second residues and applying these corrections to the variables of state.

* * * * *

UNITED STATES PATENT AND TRADEMARK OFFICE
CERTIFICATE OF CORRECTION

PATENT NO. : 7,107,169 B2
APPLICATION NO. : 10/911521
DATED : September 12, 2006
INVENTOR(S) : Florian Vary It is certified that error appears in the above-identified patent and that said Letters Patent is hereby corrected as shown below:

Column 4, line 36, change "$WF_{flow\ meter}$" to --$WF_{flow\ meter}$--;
          line 38, change "$R_{flow\ meter}$" to --$R_{flow\ meter}$--;
          line 41, change "$X_{metering\ device}$" to --$X_{metering\ device}$--.

Column 5, line 46, change "$(\hat{X}_{metering\ device})$" to --$(\hat{X}_{metering\ device})$--.

Column 6, line 27, change "$X_{metering\ device}$" to --$X_{metering\ device}$--.

Column 7, line 34, change "z vector of state of filter" to --Z vector of state of filter--.

Signed and Sealed this

Thirteenth Day of March, 2007

JON W. DUDAS
*Director of the United States Patent and Trademark Office*